United States Patent [19]

Bouvier et al.

[11] 3,900,873

[45] Aug. 19, 1975

[54] INSTALLATION FOR MEASUREMENT BY RADIO-ELECTRIC TRANSMISSION OF A DISTANCE BETWEEN TWO STATIONS

[75] Inventors: Pierre Bouvier, Suresnes; Max Schumperli, Vaucresson, both of France

[73] Assignee: Electronique Marcel Dassault, Paris, France

[22] Filed: July 30, 1973

[21] Appl. No.: 383,568

[30] Foreign Application Priority Data

Aug. 2, 1972 France .............................. 72.27890

[52] U.S. Cl. ............ 343/12 R; 343/6.5 R; 343/17.5

[51] Int. Cl. ............................ G01s 9/24; G01s 9/56

[58] Field of Search .......... 343/6.5 R, 6.5 LC, 12 R, 343/17.5

[56] References Cited

UNITED STATES PATENTS

| | | | |
|---|---|---|---|
| 3,183,506 | 5/1965 | Webb | 343/12 R X |
| 3,419,867 | 12/1968 | Pifer | 343/7 A |
| 3,566,268 | 2/1971 | Webb | 325/41 |
| 3,634,860 | 1/1972 | Rittenbach | 343/12 R X |
| 3,729,736 | 4/1973 | Fletcher | 343/6.5 R |

*Primary Examiner*—Malcolm F. Hubler
*Attorney, Agent, or Firm*—Scrivener Parker Scrivener and Clarke

[57] ABSTRACT

An installation for the measurement of the distance between a first station and a second station by the duration of a radio-electrical transmission going and returning between the two stations, the first station comprising a transmitter the reception from which at the second station controls a transmission from this latter received in its turn at the first station and compared with the transmission from this latter station, in which the signals transmitted are high frequency signals modulated in phase by a pseudo-code or P-N code, the comparison of the signals received with the signals emitted being obtained by the determination of correlation function values for two phase differences of time, distinct from one another, of the period of the bits of the reference code in accordance with a system known as a "delay lock" or binary hunting loop, wherein at least at one station the values to be correlated with the signals received are applied to a given circuit path via a commutation switch which alternately connects to the said circuit path one output and another output of the code generator.

4 Claims, 3 Drawing Figures

INSTALLATION FOR MEASUREMENT BY RADIO-ELECTRIC TRANSMISSION OF A DISTANCE BETWEEN TWO STATIONS

The invention relates to an installation for the measurement by radio-electric transmission of a distance between two stations.

The method used with the installation is that a radio transmitter transmits from a first station modulated signals which are picked up by a second station provided with a responsive transmitter and transmitting in its turn modulated signals controlled as they are received, the second modulated signals being received at the first station, and the distance between the two stations being determined starting from a comparison at this first station of the modulation emitted in relation to the modulation received.

The invention applies in particular to the system of transmission with phase modulation in accordance with the terms of a pseudo-code or function, the determination of the distance being effected at the first station by the formation of the function of correlation between the modulation emitted and the modulation received.

In known installations of this type, the determination of the distance is effected by forming two correlation functions in two separate circuit paths, wherein the modulation of the signal received is correlated with a first function or code in a first circuit path and is, in a second circuit path, correlated with a code which is identical but out of phase by one period in relation to the code of the first circuit path, the voltage representing the difference of the two correlation functions being utilized in a loop to control the oscillator fixing the period of the two pseudo-codes or functions, as supplied at the output sides of two stages of adjacent ranks of an n-stage register.

The invention is characterized by the fact that at a given station the two correlation functions are formed in one and the same circuit path thanks to a commutation switch which puts the said circuit path in connection alternately with one and the other of the outputs of the register, a synchronous commutation being applied in order to give the voltage supplied by the circuit path the + sign and the − sign respectively as required for obtaining the error voltage applied to the oscillator.

In this way the necessity is avoided of ensuring strict equilibrium in the two circuit paths and at the same time a simplification is obtained as a result of the replacement of two circuit paths by a single circuit path.

The installation in accordance with the invention is further characterized by the fact that the correlation of the signals received with the local signals is not effected as has been usual up till now after demodulation, that is to say therefore on video-frequency signals, but on the contrary, directly on the modulated high frequency signals. In this way it is possible to minimize the influence of noise introduced into the transmission between the first station and the second station both ways, going and returning, which is advantageous particularly when the distance to be measured is considerable and the conditions of liaison difficult, as is the case when measuring the distance from a satellite to a terrestrial radio beacon or signal.

In the description which follows, given by way of example, reference is made to the attached drawing, in which.

Figure 1:
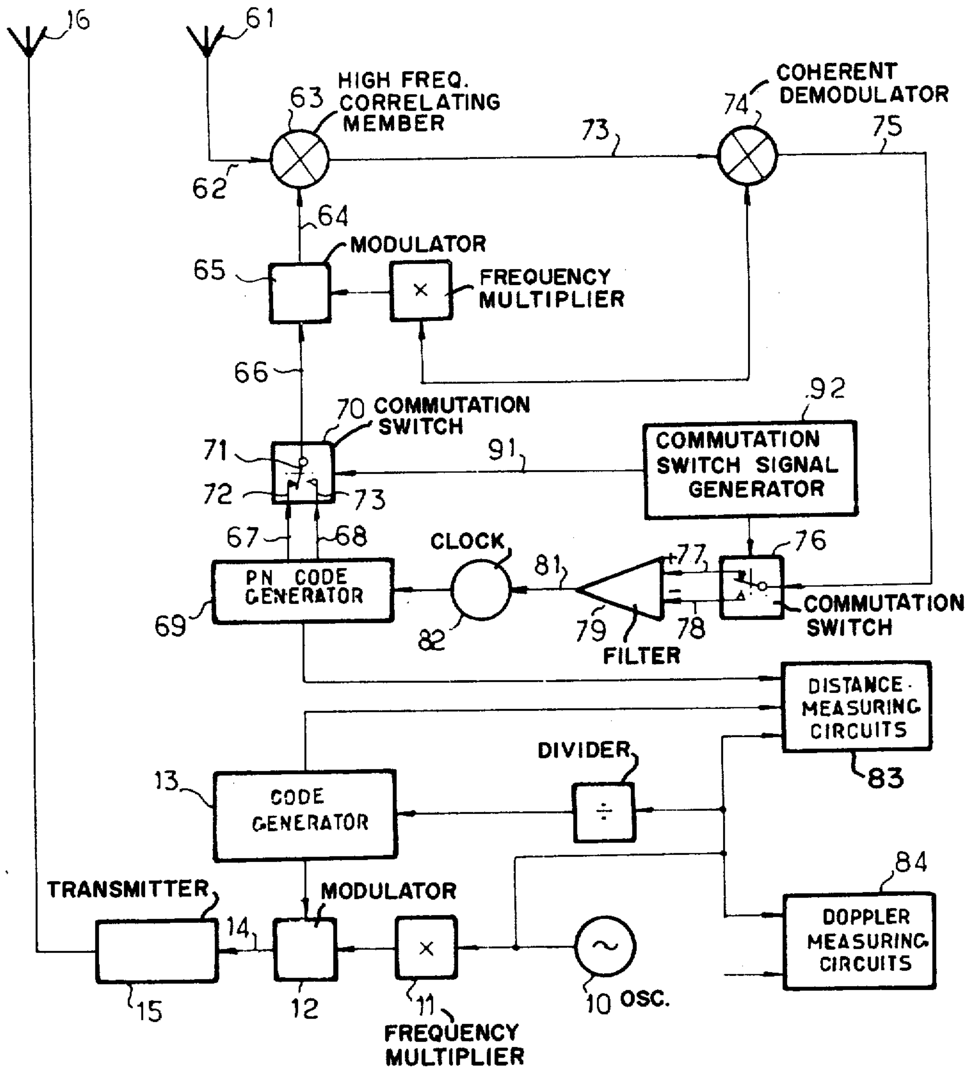
FIG. 1 is a wiring diagram of a first station.
Figure 2:
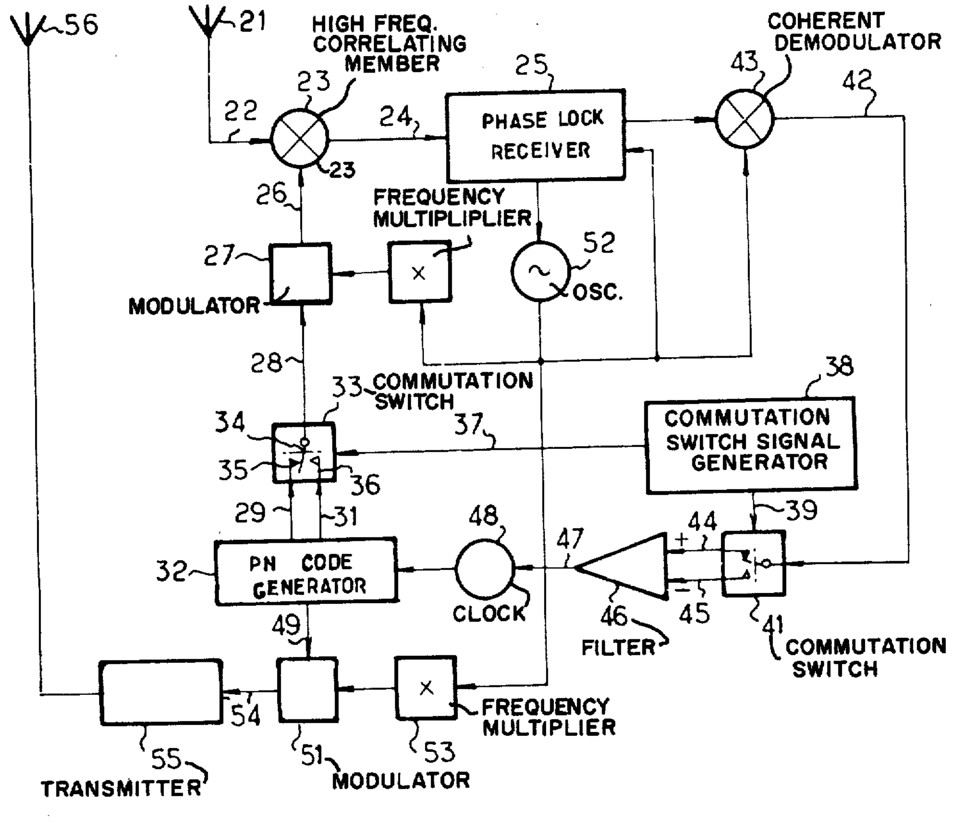
FIG. 2 is a wiring diagram of a second station.

A first station, carried by a satellite for example, comprises an ultra-stable oscillator 10 (FIG. 1), the oscillations from which, after passing through a frequency multiplier 11, are modulated in a modulator 12 by a reference code supplied by a reference code generator 13. The code is a P-N code or pseudo-function whose terms or signals +1 and −1, to the number of $(2^n - 1)$ succeed one another in accordance with the law of the code, with a period Δ. The output side 14 of the modulator is connected to a transmitter 15, the signals being radiated by an aerial 16. The second station provided for the determination of the exact distance from the first station is carried by a radio beacon, for example. It comprises an aerial 21 (FIG. 2) which picks up the signals emitted by the first station and feeds them direct to a first input 22 of a high frequency correlation member 23 forming part of a single automatic correlation circuit 24 with a phase-lock receiver 25 in accordance with a loop hunting system of the "delay lock" type. The second input 26 of the correlation member 23 is the output of a single modulator 27 whose input 28 is placed in communication alternately with the output 29 of the *n*th rank and the output 31 of the $(n - 1)$th rank, of a P-N code generator 32, and this under the control of a commutation switch 33 diagrammatically represented by a mobile member 34 and two contacts 35 and 36 positioned respectively at the outputs 29 and 31.

The commutation switch 33 is controlled by the signals which are fed to it by an output 37 of a commutation switching signal generator 38. A second output 39 of the said generator 38 controls a commutation switch 41 which thus connects the output 42 of a coherent demodulator or detector 43 connected following the phase-lock receiver 25 to the + input 44 and the − input 45 respectively, that is to say taking the + sign or the − sign respectively at the said output of the demodulator 43, of an active filter 46 whose voltage at the output 47 controls the frequency of a clock 48 controlling the passage from term to term in accordance with the $(2_n - 1)$ register supplied by the generator 32.

A third output 49 of the generator 32 feeds the code to a modulator 51 of oscillations supplied by a high frequency oscillator 52 after passing through a frequency multiplier 53. The modulated frequency is fed via the circuit element 54 to a transmitter 55 with aerial 56.

The high frequency signals thus emitted by the second station, for example carried by the radio beacon, and modulated in accordance with the code supplied by the generator 32, are received by the aerial 61 (FIG. 1) of the first station connected to the input 62 of a high frequency correlation member 63. The second input 64 of the correlation member 63 is the output of a modulator 65 whose modulation, fed via the input 66, is supplied by one or other of two outputs 67 and 68, of the *n*th rank and $(n - 1)$th rank respectively of a P-N code generator 69, under the control of a commutation switch 70 diagrammatically represented by a member 71 suitable for co-operating alternately with a contact member 72 and a contact member 73 located on the outputs 67 and 68 respectively of the generator 69. The commutation switch 70 is controlled by the signals fed to its input 91 by a commutation switching signal generator 92. The P-N code generator 69 and the reference code generator 13 are connected to the distance measurement circuit 83. The Doppler measurement circuits 84 are likewise shown.

In the single circuit element 73 forming the output of the correlation member 63 there is alternately found a first correlation function between on the one hand the signal received and the high frequency modulated by the output 67 and a second correlation function between the signal received and the high frequency modulated by the output 68.

Figure 3:
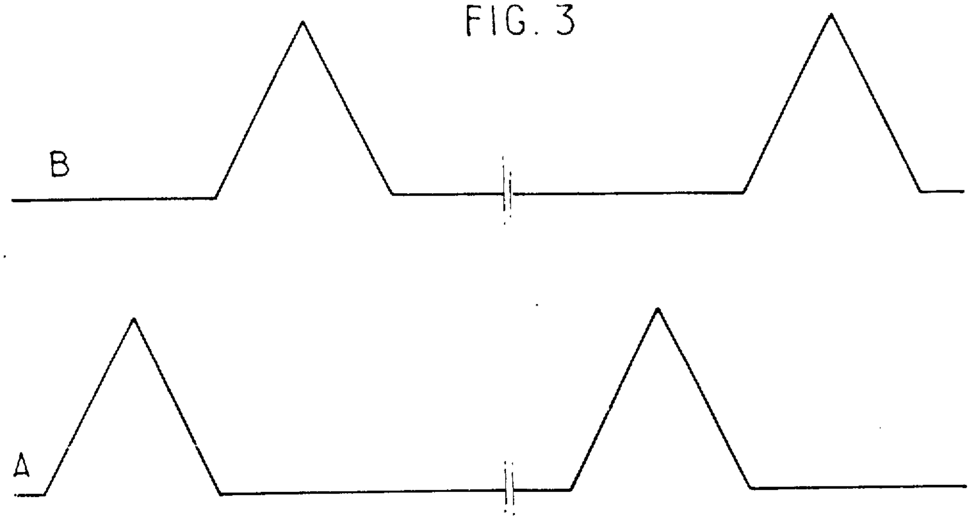
FIG. 3 shows two graphs.

The ratio of these values as a function of the phase difference between the code received and the codes appearing at the outputs 67 and 68 is shown respectively in the graphs in FIG. 3. The output 73 lead to a coherent demodulator or detector 74 whose output 75 is connected via a commutation switch 76, controlled by the signals supplied by the generator 92, to one or other of the inputs, of which one, 77, is positive, and the other, 78, is negative, of an active filter 79, at the output 81 of which is found the error voltage which controls the frequency of a clock 82 imposing the succession frequency of the bits of the code of the generator 69.

It is thus one and the same circuit path, both at the second station and also at the first station, which is utilised to cause the two amplitude values to appear, constituting the error voltage resulting from the automatic correlation for two values of time differing in phase by one period of the bits of the code.

In either of the stations the correlation is effected between high frequency signals, which minimizes the effect of the noise introduced, particularly by the propagation of waves in the path going and returning between the first station and the second station.

We claim:

1. In a ranging system of the type in which a first signal is transmitted from a first station to a second station which upon reception thereof transmits a second signal to said first station, each station including a PN code generator for phase modulating said signals and means for correlating the PN generated code with the PN modulated received signal in order to derive at said first station the distance between said two stations by generating the correlations of two successive PN codes spaced apart by one period of the PN code bit sequence and by controlling a delay-lock tracking loop by the difference between said two correlations, the improvement at at least one of said stations comprising, commutation switch means having two inputs connected to said PN code generator and one single output connected to said correlating means, and a commutation switch signal generator operatively connected to said commutation switch means, whereby the PN modulated received signals are successively and alternately correlated with said successive PN codes locally generated at said one station.

2. The system of claim 1 wherein the improvement further comprises, between said PN code generator and said commutation switch signal generator, a switch controlled by said commutation switch signal generator, the input of said switch being connected to said correlating means and the two outputs of said switch being connected, respectively, to the + input and to the − input of a filter, whereby the single output connecting the PN code generator to the correlating means is alloted respectively and successively a + and − sign.

3. A system according to claim 2 wherein the improvement further comprises a clock controlling the bit sequence of said PN code generator between said filter and said PN code generator.

4. A system according to claim 2 wherein said improvement further comprises a coherent demodulator between said switch and said correlating means.

* * * * *